United States Patent [19]

Cella et al.

[11] Patent Number: 4,808,686

[45] Date of Patent: * Feb. 28, 1989

[54] SILICONE-POLYIMIDES, AND METHOD FOR MAKING

[75] Inventors: James A. Cella, Clifton Park, N.Y.; Patrick E. Gallagher, Pittsfield, Mass.; Gary K. Shank, Clifton Park, N.Y.

[73] Assignee: General Electric Company, Schenectady, N.Y.

[*] Notice: The portion of the term of this patent subsequent to Sep. 1, 2004 has been disclaimed.

[21] Appl. No.: 63,350

[22] Filed: Jun. 18, 1987

[51] Int. Cl.[4] ............................................. C08G 77/04
[52] U.S. Cl. ........................................ 528/27; 528/26; 528/28; 528/38
[58] Field of Search .................. 526/26, 28, 38, 27

[56] References Cited

U.S. PATENT DOCUMENTS

| | | | |
|---|---|---|---|
| 4,480,009 | 10/1984 | Berger | 528/26 |
| 4,504,632 | 3/1985 | Holub et al. | 528/26 |
| 4,586,997 | 5/1986 | Lee | 528/26 |
| 4,690,997 | 9/1987 | Cella et al. | 528/26 |

*Primary Examiner*—John C. Bleutge
*Assistant Examiner*—R. Dean, Jr.
*Attorney, Agent, or Firm*—William A. Teoli; James C. Davis, Jr.; James Magee, Jr.

[57] ABSTRACT

Silicone-polyimides having improved flexibility can be obtained, by sequentially intercondensing organic diamine, aminoorgano terminated polydiorganosiloxane and aromatic bisanhydride. A decrease in flexural modulus and an increase in elongation percent is effected while flame retardance remains substantially unchanged.

15 Claims, No Drawings

SILICONE-POLYIMIDES, AND METHOD FOR MAKING

BACKGROUND OF THE INVENTION

Prior to the present invention, as shown by Holub, U.S. Pat. No. 3,325,450, polysiloxane imides useful as insulation for electrical conductors were prepared by effecting reaction between a diaminopolysiloxane and benzophenonedianhydride in the presence of a suitable organic solvent, such as dimethylformamide, N-methyl-2-pyrrolidone, cresol, etc. The initial reaction was generally carried out from room temperature to 150° C. resulting in the production of an intermediate polyamide acid derivative. Thereafter, the solvent was removed from the resulting amide acid derivative by heating at temperatures of from about 150° C. to 400° C. to effect cyclization and formation of the imide structure.

A related procedure is shown by Greber, Polykondensationsreaktionen Bifunktioneller Siliciumorganischer Verbindungen, Journal fur praktische Chemie. Band 313, Heft 3, 1971, S. 461–483, J. A. Barth, Leipzig. Although the procedure of Greber is somewhat different from that shown by Holub, both Holub and Greber utilize a dipolar aprotic solvent, such as dimethylacetamide to form a solution of a silicone-polyamide acid from which films can be cast onto a substrate and further heating is required to effect the cyclization of the polyamide acid to the polyimide state.

Improved results in methods for making silicone-polyimides can be obtained by utilizing aromatic bis(ether anhydride) or the corresponding tetracarboxylic acid in combination with amino alkylene terminated polydiorganosiloxanes as shown, for example, by Takekoshi et al., U.S. Pat. No. 3,833,546 and Heath et al., U.S. Pat. No. 3,847,867, assigned to the same assignee as the present invention.

Although silicone-polyimides have long been recognized for their potential as a source for extrudable wire coating insulation, the flammability requirements of the wire coating industry has generally restricted the use of these materials. In addition to flame retardance, wire coating fabricators also favor extrudable wire coating insulation having at least 150% elongation at break when pulled laterally from a clamped portion of the extrudate along the wire surface. However, efforts to increase the elongation characteristics of silicone-polyimide by increasing the weight percent of silicone has generally been found to increase the flammability of the silicone-polyimide.

In copending application Ser. No. 760,792, now U.S. Pat. No. 4,690,997, it was found that silicone-polyimide utilizing aromatic bis(etheranhydride), an aminoalkylene-terminated polydiorganosiloxane having a critical block length was extrudable onto wire and exhibited an elongation percent of 150 or greater while satisfying UL-94 flammability requirements.

As taught in Ser. No. 760,792, now U.S. Pat. No. 4,690,997, wire coating industry requirements can be satisfied providing a critical relationship is maintained between the polydiorganosiloxane block length and the weight percent silicone which is preferably 25% to 45% by weight based on the weight of silicone-polyimide. Polydiorganosiloxane block lengths having an average value of about 20 diorganosiloxy units or less has been found to provide effective results, while a block length of about 5 to about 15 chemically combined diorganosiloxy units is preferred.

Flame retardant silicone-polyimides can be made by the method shown in copending application Ser. No. 760,792 by effecting reaction between amine-terminated polydiorganosiloxane or "siliconediamine" having the formula,

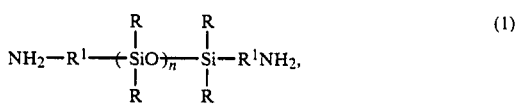

aryldiamine having the formula, $$NH_2R^2NH_2, \qquad (2)$$

with substantially equal molar amounts of aromatic bisanhydride, preferably aromatic bis(etheranhydride) of the formula,

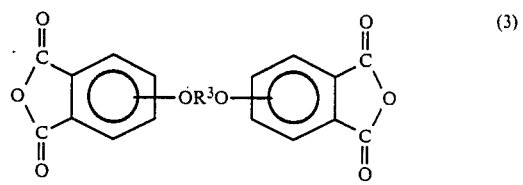

and organic dianhydrides, as defined hereinafter, where R is the same or different $C_{(1-14)}$ monovalent hydrocarbon radical, or $C_{(1-14)}$ monovalent hydrocarbon radical substituted with radicals inert during intercondensation, $R^1$ is a $C_{(2-14)}$ divalent hydrocarbon radical, or $C_{(2-14)}$ divalent hydrocarbon radical substituted with radicals neutral during intercondensation, $R^2$ is a divalent $C_{(6-14)}$ arylene radical, $R^3$ is a divalent $C_{(6-30)}$ arylene radical, and n is an integer having an average value of 3 to 20 inclusive and preferably 5 to 15.

$R^1$ is preferably $C_{(1-4)}$ polyalkylene, and $R^3$ is preferably a divalent arylene radical selected from the class consisting of

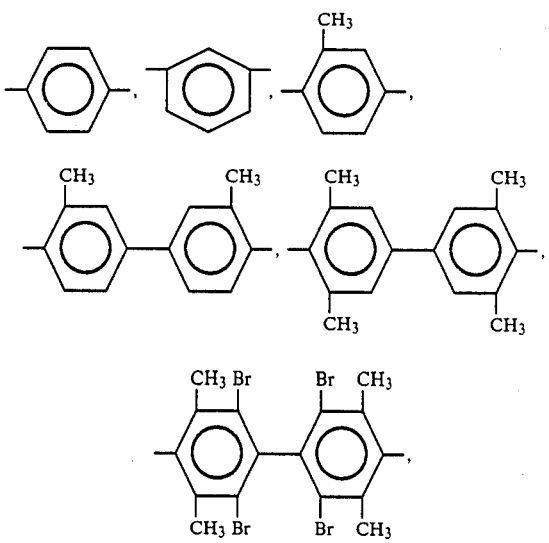

-continued

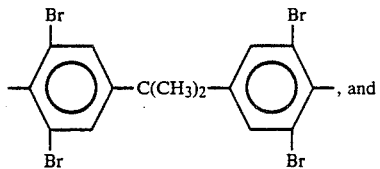, and

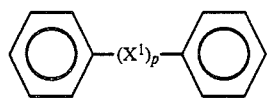

$X^1$ is a member selected from the class consisting of

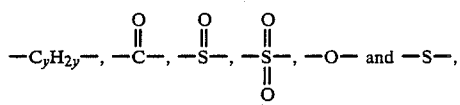

p is equal to 0 or 1, and y is an integer equal to 1 to 5 inclusive.

Experience has shown that although the silicone-polyimides made in accordance with the method of Ser. No. 760,792, now U.S. Pat. No. 4,690,997, can provide valuable flame retardant fire coating compositions, the degree of elongation and flexibility in terms of flexural modulus often does not satisfy the requirements of the wire coating industry.

The present invention is based on our discovery that a substantial improvement in silicone-polyimide flexibility can be achieved by making the silicone polyimide in step-wise manner instead of simultaneously intercondensing the aromatic bisanhydride with the aryldiamine and the silicone diamine. It has been found that simultaneous intercondensation of the amine anhydride reactants can result in the production of a high molecular weight random silicone-polyimide. However, sequential addition of the aromatic bisanhydride, siliconediamine and aryldiamine has been found to form "oligomeric imide" which preferably has a $\overline{DP}$ (degree of polymerization) of from about 1.5 to about 50 intercondensed aromatic bisanhydridesilicone diamine groups, or aromatic bisanhydridearyldiamine groups, and terminated with a member selected from the class consisting of intercondensed aromatic bisanhydride, aryldiamine, or siliconediamine.

The term "flexibility" when defining the properties of the silicone polyimide made in accordance with the practice of the present invention, can be correlated with a reduction in the flexural modulus of the silicone polyimide as a result of "sequential intercondensation", as distinguished from "random intercondensation" of the aromatic bisanhydride, the aryldiamine and the siliconediamine. It also has been found that an increase in the elongation percent often occurs when sequential intercondensation is used. The term "aromatic bisanhydride" hereinafter means aromatic bis(etheranhydride) of formula (3), a mixture of such formula (3) diahydride with pyromellitic dianhydride, or benzophenone dianhydride, or biphenyldianhydride, or one or more of the latter dianhydrides free of the formula (3) dianhydride. The term "diamine" hereinafter means either the amine-terminated polydiorganosiloxane of formula (1) or the aryldiamine unless the particular bifunctional amine is specifically identified.

STATEMENT OF THE INVENTION

A silicone-polyimide comprising by weight from about 40 to about 90% of arylimide units chemically combined with from 10 to about 60% of polydiorganosiloxane, which silicone-polyimide has an elongation % of at least 100 and a flexural modulus (psi) of from about 40,000 to 150,000 and is the intercondensation product of reaction of a mixture comprising oligomeric imide selected from the class consisting of, (A) an amine-anhydride intercondensation mixture comprising at least two oligomeric imides which consist essentially of chemically combined repeat groups of aromatic bisanhydride intercondensed with a member selected from aryldiamine or siliconediamine, and terminated with an intercondensed member selected from the class consisting of aromatic bisanhydride, aryldiamine, or siliconediamine, and (B) an amine-anhydride intercondensation mixture selected from,
 i. a mixture comprising aryldiamine or siliconediamine and aromatic bisanhydride terminated oligomer of (A),
 ii. a mixture comprising aromatic bisanhydride and aryldiamine, and siliconediamine terminated oligomer of (A),
 iii. a mixture comprising aromatic bisanhydride and siliconediamine, and aryldiamine terminated oligomer of (A), where the moles in (A) or (B) of aromatic bisanhydride, and/or of terminal intercondensed aromatic bisanhydride are substantially equivalent to the moles of aryldiamine, or silicone diamine, and/or terminal intercondensed siliconediamine or aryldiamine, and there is used to make the oligomeric intercondensation mixture of (A) or (B), from >0.5 to <1 mole, or >1 to <2 moles of aryldiamine or siliconediamine, per mole of aromatic bisanhydride.

The chemically combined arylimide units of the silicone-polyimides of the present invention, are shown as follows:

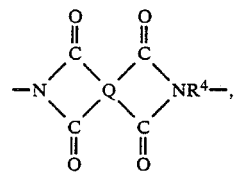 (4)

where $R^4$ is selected from the same or different $R^1$ or $R^2$ radicals, as previously defined, or a mixture thereof, Q is a tetravalent radical selected from

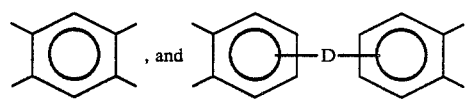

D is a member selected from $$-O-, -S-, -\overset{O}{\underset{\|}{C}}NR^1N\overset{O}{\underset{\|}{C}}-, -\overset{O}{\underset{\|}{C}}-,$$

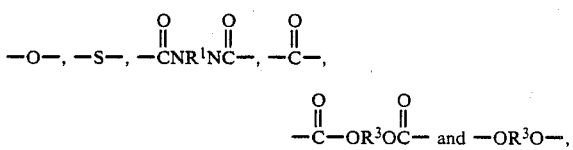

and $R^3$ is a divalent radical selected from

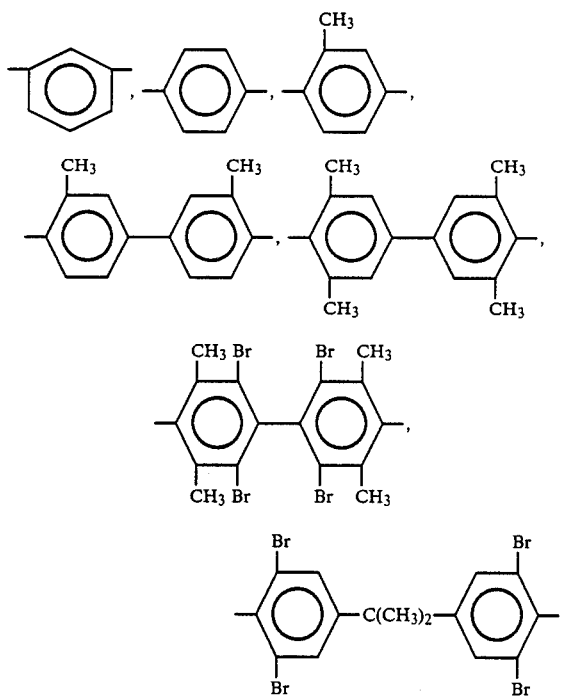

and divalent organic radicals of the general formula,

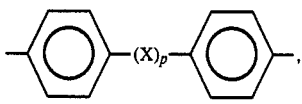

X is a member selected from the class consisting of divalent radicals of the formula,

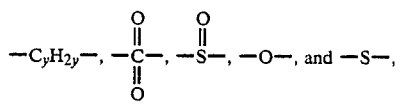

and p and y are as previously defined.

Among the preferred arylimide units of formula (4), there are included aryletherimide units of the formula,

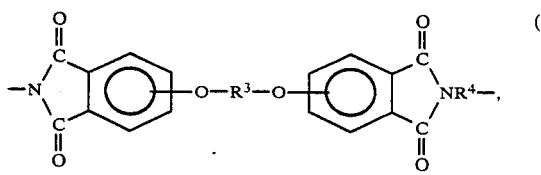

where $R^3$ and $R^4$ are as previously defined.

Radicals included within R of formula (1) are, for example, $C_{(1-8)}$ alkyl radicals such as methyl, ethyl, propyl, butyl, pentyl, etc.; $C_{(6-13)}$ aryl radicals such as phenyl, tolyl, xylyl, anthryl; halogenated alkyl and aryl radicals such as chlorophenyl; cyanoalkyl radicals, for example, cyanoethyl, cyanobutyl, trifluoropropyl, etc. Radicals included within $R^1$ of formula (1) are, for example, $C_{(1-8)}$ alkylene radicals such as methylene, dimethylene, trimethylene, tetramethylene, etc. and arylene radicals such as phenylene, tolylene, xylene, naphthalene, etc. Radicals included within $R^2$ of formula (2) are, for example, phenylene, xylylene, tolylene, naphthylene.

Aromatic bisanhydrides which can be utilized in the practice of the present invention are preferably aromatic bis(etheranhydride)s of formula (3). Some of the dianhydrides included within formula (3) are, for example, 2,2'-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis)2,3-dicarboxyphenoxy)diphenyl sulfide dianhydride;

1,4-bis(2,3-dicarboxyphenoxy)benzene dianhydride;

4,4'-bis(2,3-dicarboxyphenoxy)diphenylsulfone dianhydride, etc.;

2,2-bis[4-(3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)diphenylsulfone dianhydride;

4-(2,3-dicarboxyphenoxy)-4'(3,4-dicarboxyphenoxy)-2,2-diphenylpropane dianhydride, etc.

The dianhydrides of formula (3) can be made in accordance with Webb, U.S. Pat. No. 4,116,980, assigned to the same assignee as the present invention.

In addition to the preferred aromatic bis(ether anhydrides) of formula (3), there can be used other aromatic bisanhydrides either separately or in combination with such aromatic bis(ether anhydrides) as previously indicated. These aromatic bisanhydrides can be used at up to 50 mole percent based on total dianhydride.

Procedures for making the aminoorgano terminated polydiorganosiloxane of formula (1) are well known in the art. For example, aminoorganotetraorganodisiloxane can be equilibrated with an octaorganocyclotetrasiloxane, such as octamethylcyclotetrasiloxane, to increase the block length of the polydiorganosiloxane. The corresponding aminoorganotetraorganodisiloxane, such as aminobutyltetramethyldisiloxane can be made by the procedure shown by Prober, U.S. Pat. No. 3,185,719, assigned to the same assignee as the present invention. Prober reacts allylcyanide with dimethylchlorosilane and then hydrolyzes the resulting cyanopropyldimethylchlorosilane in the presence of sodium bicarbonate to produce the 1,3-bis-γ-cyanopropyltetramethyldisiloxane which then can be reduced with hydrogen in the presence of Raney nickel to yield 1,3-bis-δ-aminobutyltetramethyldisiloxane. In a similar manner, 1,3-aminopropyl terminated polydimethylsiloxane can be obtained by the equilibration of 1,3-bis-γ-aminopropyltetramethyldisiloxane which is prepared by utilizing acrylonitrile in a manner similar to that shown for the production of aminobutyltetramethyldisiloxane utilizing allylcyanide.

Included within the aryldiamines of formula (2) are, for example, m-phenylene diamine;

p-phenylenediamine;

4,4'-diaminodiphenylpropane;

4,4-diaminodiphenylmethane;
benzidine;
4,4'-diaminodiphenyl sulfide;
4,4'-diaminodiphenyl sulfone;
4,4'-diaminodiphenyl ether;
1,5'-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3'-diamino-4-isopropylbenzene;
1,2-bis(3-aminopropoxy)ethane;
m-xylylenediamine;
p-xylylenediamine;
2,4-diaminotoluene;
2,6-diaminotoluene.

In the practice of the invention, the silicone-polyimide is made by sequentially intercondensing at temperatures in the range of 100° C. to 300° C., the amine-terminated polydiorganosiloxane of formula (1) and the aryl diamine of formula (2) with aromatic bisanhydride. In particular situations, a diamine mixture having up to about 10 mol percent of the silicone diamine mixed with aryldiamine, or up to about 10 mol percent of aryldiamine mixed with silicone diamine can be used if feasible without substantially affecting the improved flexibility characteristic in the final silicone-polyimide. A substantially inert organic solvent can be used to facilitate intercondensation. Suitable solvents are, for example, dipolar aprotic solvents, such as dimethylformamide, N-methyl-2-pyrrolidone, cresol, orthodichlorobenzene, etc.

The sequential intercondensation of the aryldiamine and silicone diamine with the aromatic bisanhydride can be achieved in either a single container or in multiple containers.

In the "single pot" procedure, an off stoichiometric amount of either the aryldiamine, or silicone diamine, is intercondensed with the aromatic bisanhydride in the presence of an inert organic solvent to produce a mixture of polyimide oligomer chain stopped with either intercondensed diamine or aromatic bisanhydride. An excess of aromatic bisanhydride or diamine corresponding to the chain stopping units also can be present. The oligomer can be either a silicone polyimide, or an oligomer of intercondensed aromatic bisanhydride and aryldiamine. There is then added to the same pot, after the initial period of oligomer formation, the remaining diamine, which can be either the aryldiamine, or silicone diamine and optionally sufficient aromatic bisanhydride to achieve stoichiometry. There also can be added to the resulting intercondensation mixture, chain stoppers, such a phthalic anhydride or monofunctional arylamine such as aniline to control the molecular weight of the final silicone polyimide.

In the multiple pot procedure, aryldiamine oligomer and siliconediamine oligomer can be intercondensed with aromatic bisanhydride in separate containers. The multiple pot procedure can achieve satisfactory results in instances where two or more oligomers are required providing a substantially stoichiometric balance maintained between total aromatic bisanhydride and diamine.

Oligomer block size can vary depending upon the proportions of aryldiamine, or silicone diamine used, per mole of aromatic bisanhydride. For example, for a "three block", oligomer, a 4/3 ratio can be used, i.e. 4 moles of diamine for 3 of bisanhydride, as shown by the following equation:

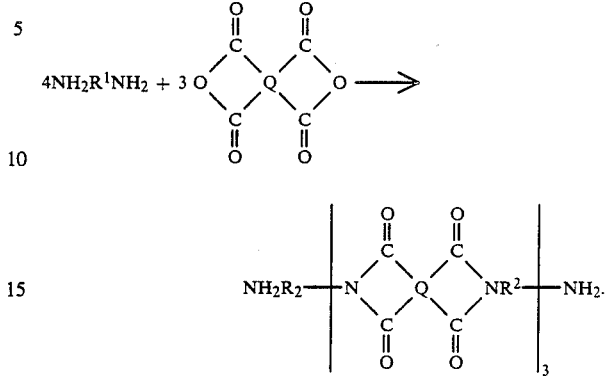

Reaction can continue until the intercondensation of anhydride and amine functional groups are achieved and thee water of reaction is completely removed, such as by azeotroping from the reaction mixture. A typical polymerization catalyst can be used at 0.025 to 1.0% by weight, based on the weight of the reaction mixture, such as an alkali metal aryl phosphinate or alkali metal aryl phosphonate, for example, sodium phenylphosphonate.

The silicone-polyimide can be isolated by diluting the reaction mixture with a material, such as chloroform to reduce the solids level to about 10% and reprecipitating the resulting mixture in an organic solvent such as isopropanol. The resulting silicone-polyimide can thereafter be dried by conventional means, such as a vacuum oven.

The silicone-polyimides of the present invention are valuable as wire coating compositions and can be extruded onto metallic conductors such as aluminum or copper wire to thicknesses up to 50 mil.

In addition to its use as a wire coating, the silicone-polyimide described herein is suitably employed as a film, fiber or foam. Films of silicone-polyimides can be extruded at thicknesses as low as about 1 mil and temperatures ranging from about 150° to 400° C. or the film may be cast from solvents including methylene chloride and toluene. Fibers of silicone-polyimide may be pulled from an extruded strand or spun according to practices common in the art. Foams of silicone-polyimide are useful as flame retardant insulation or flame retardant padding in, for example, the manufacture of public transportation vehicles. Foams may be blown mechanically, or by the use of either solid or liquid chemical blowing agents. Suitable chemical blowing agents include the chlorofluorocarbons such as CFC 11, CFC 12, and CFC 114. These blowing agents are liquid and can be added under pressure to molten silicone-polyimide in an extruder barrel to make shaped foam articles.

In order that those skilled in the art will be better able to practice the present invention, the following examples are given by way of illustration and not by way of limitation. All parts are by weight unless otherwise specified.

EXAMPLE 1

A mixture of 1720 grams (2.175 moles) of a polydimethylsiloxane having a molecular weight of 790.86 and an average of 8.34 chemically combined dimethylsiloxy units and terminal γ-aminopropyl dimethylsiloxy units, 1753 grams (3.263 mole) of 2,2'-bis[4-(3,4-dicarboxy)phenyl]propane dianhydride (BPADA) and 13.26 liters of orthodichlorobenzene was heated under nitrogen for 2 hours with stirring at 140° C. The temperature of the mixture was slowly raised until water and approximately 4.4 liters of orthodichlorobenzene were removed. Based on method of preparation, there was formed a mixture of BPADA and a silicone oligomer having the approximate formula,

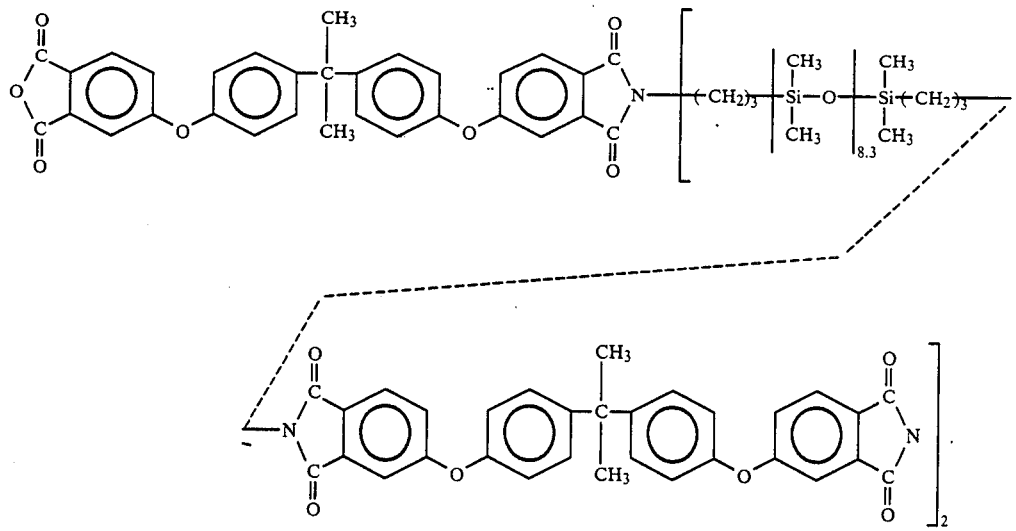

There was added to the above mixture, at a temperature of about 100° C. with stirring, 353 grams (3.26 mole) of meta-phenylenediamine, 1139 grams (2.067 mole) of BPADA, 10.37 grams (0.07 mole) of phthalic anhydride, 12.95 grams of sodium phenyl phosphinate, and 4.50 liter of ortho-dichlorobenzene. The mixture was again heated at 104° C. for 2 hours and the temperature was then raised until approximately 4.5 liters of ortho-dichlorobenzene were removed. During the water removal stage, it was found that considerable foaming occurred. The reaction mixture was heated at reflux for an additional 3 hours. The mixture was allowed to cool and then diluted with 6.2 liters of methylenechloride. The product was isolated by pouring the mixture into about 50 liters of isopropanol. The precipitated product was dried, redissolved in methylenedichloride to a concentration of 15–20% solids and then reprecipitated into 5 volumes of isopropanol. The final product was collected in a centrifugal filter and dried to provide 3.8 kilograms of product. Based on method of preparation, the product was a sequentially formed silicone-polyimide consisting essentially of chemically combined silicone imide oligomeric blocks, as previously defined, intercondensed with bisphenol-A dianhydride units and meta-phenyleneamine and chain-stopped with intercondensed phthalic anhydride. The resulting silicone-polyimide was found to be a clear or translucent materials which could be hot pressed into a tough flexible film. The GPC molecular weight of the copolymer was found to be in the range of about 50,000 to 80,000; its intrinsic viscosity was from 0.55 to 0.8 in chloroform. This "sequentially made" silicone-polyimide was found to have a flexural modulus (psi) of about 74,000 and an elongation percent of about 195.

The same procedure was repeated, except that all of the bisphenol-A dianhydride was simultaneously intercondensed with substantially equal molar amounts of the aminopropyl-terminated polydimethylsiloxane and meta-phenylenediamine along with the phthalic anhydride. The silicone-polyimide which was recovered was found to have an MW(GPC) in the range of from 50,000 to 80,000 and intrinsic viscosity in the range of from 0.5 to 0.8 in chloroform. The silicone-polyimide was found to be a transparent material which had a flexural modulus (psi) of about 260,000 and an elongation % of about 100-150. This random silicone-polyimide was not as flexible as the silicone polyimide made by sequential addition and was less useful as an extrudable wire coating insulator.

EXAMPLE 2

A mixture of 504 parts of BPADA (0.97 mole), 75.6 parts of meta-phenylenediamine (0.7 mole), about 8.88 parts of phthalic anhydride (0.06 mole), about 0.06 part of sodium phenylphosphinate, and 2107 parts of ortho-dichlorobenzene was heated slowly to a temperature of 140° C. while the mixture was agitated. Based on method of preparation, there was formed a mixture of BPADA and an oligomeric polyimide consisting essentially of intercondensed BPADA units and meta-phenylene diamine having the average formula,

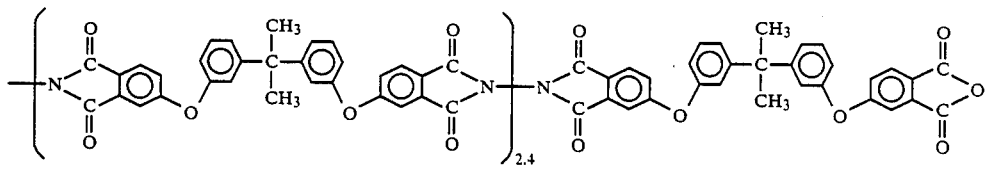

While the above mixture was maintained at a temperature of 140° C., there was added over a 70-minute period 385 parts of a polydimethylsiloxane having an average of about 15 chemically combined dimethyldiloxy units and terminal aminopropyl dimethylsiloxy units. After the addition was complete, the reaction was heated to 170° C. and maintained at that temperature under external reflux for the removal of water. After 1 hour, the material was pumped to a devolatilizing high polymerizer at 320° C. at 25 torr to produce 400 parts of product. Based on method of preparation, there was obtained a silicone-polyimide having about 40% by weight of chemically combined dimethylsiloxane and about 60% by weight of polyimide, consisting essentially of the above oligomeric polyimide intercondensed with BPADA and meta-phenyleneamine and chain-terminated with intercondensed phthalic anhydride units.

The same procedure was repeated except that all of the ingredients consisting of BPADA, phthalic anhydride, aminopropyl-terminated polydimethylsiloxane, and meta-phenylenediamine were simultaneously intercondensed. There was obtained a silicone-polyimide "simultaneous" having about 40% by weight of chemically combined polydimethylsiloxane intercondensed with about 60% by weight of polyimide. Table I shows the properties of the silicone-polyimides made by the "Simultaneous" addition as compared to the addition in accordance with the practice of the present invention "Sequential":

TABLE I

|  | Simultaneous | Sequential |
| --- | --- | --- |
| Tensile (psi) | 5,400 | 4,900 |
| Elongation (%) | 51 | 100 |
| Flexural Modulus (psi) | 185,400 | 165,000 |
| HDT (264 psi) °C. | 75 | 72 |
| UL-94 | V-O | V-O |
| Color | brown | lt. yellow |

The above results show that the sequentially formed silicone-polyimide experienced a reduction in flexural modulus and an increase in elongation. The flexibility of the sequential silicone-polyimide was found to be greater than the simultaneous silicone-polyimide. The utility of the sequentially made silicone-polyimide as a flame retardant insulator for coating wires was substantially improved. It was further found that the silicone-polyimides differed with respect to each other in terms of average molecular weight and distribution of the aromatic polyimide segments.

EXAMPLE 3

The procedure of Example 1 was repeated, except that a silicone diamine having an average of about 10 chemically combined dimethylsiloxy units was used. The silicone diamine was used to make a series of silicone-polyimides having the same average composition by weight (about 35% by weight silicone) with oligomer block sizes of about 3-7. A random silicone polyimide also was prepared using the same silicone diamine. Table II shows the results obtained:

TABLE II

| Block Size | MW$_w$ (GPC) | % Elongation | Flexural Modulus (psi) |
| --- | --- | --- | --- |
| Random | 83,700 | 94 | 196,650 |
| 3 | 66,100 | 120 | 59,850 |
| 4 | 63,890 | 148 | 46,600 |
| 5 | 54,170 | 101 | 34,200 |
| 6 | 99,284 | 187 | 32,775 |
| 7 | 71,634 | 144 | 28,500 |

The following procedure was used to measure Flexural Modulus (psi):

Polymers to be molded were predried at 150° C. in a vacuum oven immediately prior to pressing. A 5"×0.5"×0.125" mold was filled with 5-6 gms of dry polymer and heated at 300° C. at atmospheric pressure for 5 minutes. Slight pressure was applied to the mold (500 psi) for about 5 minutes and the final molding was done at 10,000 psi (5 min). The mold was allowed to cool for 20-30 minutes prior to removal of the specimen.

Flexural modulus on the specimen thus obtained were determined on an Instron Mechanical Tester. The following test conditions were employed: support span=2.25", crosshead speed 0.05 in/min, depth of specimen 0.125", width of specimen 0.5". The stress-strain curve was recorded on an XY plotter and the flexural modulus of each specimen was determined from the slope of the curve and the expression;

$$E_b = L^3 m / 4bd^3,$$

where $E_b$=Modulus of Elasticity in Bending (Flexural Modulus), L=Support Span, b=width of specimen, d=depth of specimen, and m=slope of the initial portion of the stress strain curve (lbs/in).

EXAMPLE 4

A silicone polyimide was prepared by effecting the intercondensation in orthodichlorobenzene of a first oligomeric imide having a $\overline{DP}$ of about 2 consisting essentially of intercondensed bisphenol-A dianhydride and aminopropyl terminated polydimethylsiloxane and chain terminated with intercondensed bisphenol-A dianhydride with a second oligomeric imide having a $\overline{DP}$ of about 2 consisting essentially of intercondensed bisphenol-A dianhydride and meta-phenylene diamine and chain terminated with intercondensed metaphenylene diamine.

The first oligomeric imide was made by slowly heating to 140° C. with stirring for 1.5 hours under a nitrogen atmosphere, a mixture of 12.89 gm (24 mmol) of 2,2-bis[4-3,4-dicarboxyphenoxy)phenyl]propane dianhydride (bisphenol-A dianhydride or "BPADA"), 13.26 gm (16 mmol) of an aminopropyl-terminated polydimethylsiloxane having an average of 14.8 intercondensed dimethylsiloxy units, and 96.77 ml of orthodichlorobenzene. The mixture was then slowly heated to 220° C. with stirring to effect water removal and orthodichlorobenzene. The mixture was then refluxed at 210° C. for 3 to 4 hours under nitrogen. There was obtained upon cooling an imide oligomer having a $\overline{DP}$ of about 2, which consisted of chemically combined bisphenol-A dianhydride units and aminopropyl terminated polydimethyl siloxane units and terminated with intercondensed bisphenol-A dianhydride.

The second oligomeric imide was prepared by heating a mixture to a temperature of 140° C. under a nitrogen atmosphere with stirring of 8.16 gms (15.2 mmol) of BPADA, 2.59 gms (24 mmol) of metaphenylenediamine, 0.074 gm (0.50 mmol) of phthalicanhydride, 0.0370 gm (300 ppm) of sodiumphenylphosphonate, and 57.75 ml of orthodichlorobenzene. The mixture was then refluxed at 210° C. as described above. There was obtained upon cooling an imide oligomer having a $\overline{DP}$ of about 2, which consisted of metaphenylene diamine intercondensed with BPADA and terminated with intercondensed metaphenylene diamine.

After the mixture had cooled to ambient conditions, the first oligomeric imide mixture was added to the second oligomeric imide mixture. There was then added an additional 50 ml of orthodichlorobenzene to the total and the resulting mixture was refluxed for 4 hours. The mixture was then allowed to cool to ambient temperatures and an equal volume of chloroform was added. The mixture was then poured into isopropanol and product precipitated. The product was isolated and dried in a vacuum oven. Based on method of preparation, the product was a silicone-polyimide having an MW of 55,000 with terminal phthalic anhydride groups and chemically combined blocks of aminopropylpolydimethylsiloxaneimide and metaphenyleneimide. The silicone polyimide had an elongation percent and flexural modulus (psi) similar to the silicone polyimide of Example 3 having a $\overline{DP}$ of about 3. The silicone polyimide consisted of about 36% by weight silicone and it was useful as a wire coating insulator.

Although the above examples are directed to only a few of the very many variables which can be used in the practice of the present invention to make the oligomeric silicone-polyimides, it should be understood that a much broader variety of oligomeric silicone-polyimides can be made utilizing the ingredients and methods shown in the description proceeding these examples.

What is claimed and sought to be protected by Letters Patent of the United States is as follows:

1. Flame retardant extrudable silicone polyimide having improved flexibility and useful as a wire-coating insulator comprising by weight from about 40 to 90% of arylimide units chemically combined with from 10 to about 60% of polydiorganosiloxane having an elongation of at least 100% and a flexural modulus (psi) of from about 28,500 to 150,000.

2. A flame retardant extrudable silicone polyimide in accordance with claim 1, which is the condensation product of reaction of a mixture comprising aryl diamine, aromatic bisanhydride and a silicone polyimide oligomer having terminal anhydride groups and a degree of polymerization of from about 1.5 to 50 repeat units.

3. A flame retardant extrudable silicone polyimide in accordance with claim 1, which is the condensation product of reaction of a mixture comprising silicone diamine, aromatic bisanhydride and aryl polyimide oligomer having terminal anhydride groups and a degree of polymerization of from about 1.5 to 50 repeat units.

4. A silicone-polyimide in accordance with claim 1, which is the condensation production of reaction of at least two oligomeric imides.

5. A flame retardant extrudable silicone polyimide in accordance with claim 2, where the aryl diamine is metaphenylenediamine.

6. A flame retardant extrudable silicone polyimide in accordance with claim 3, where the silicone diamine is an aminopropylpolydimethylsiloxane.

7. A flame retardant extrudable silicone polyimide in accordance with claim 2, where the aromatic bisanhydride is a mixture of aromatic bisanhydrides.

8. A flame retardant extrudable silicone polyimide in accordance with claim 2, where the aromatic bisanhydride is an aromatic bis(ether anhydride).

9. A flame retardant extrudable silicone polyimide in accordance with claim 2, where the aromatic bisanhydride is 2,2-bis[4-(3,4-dicarboxyphenoxy)phenyl]propane dianhydride.

10. A flame retardant extrudable silicone polyimide in accordance with claim 3, where the aromatic bisanhydride is a mixture of aromatic bisanhydrides.

11. A flame retardant extrudable silicone polyimide in accordance with claim 3, where the aromatic bisanhydride is an aromatic bis(ether anhydride).

12. A flame retardant extrudable silicone polyimide in accordance with claim 3, where the aromatic bisanhydride is 2,2-bis[4-(3,4-dicarboxyphenoxy)phenyl]propane dianhydride.

13. A silicone-polyimide foam in accordance with claim 1.

14. A silicone-polyimide film in accordance with claim 1.

15. A silicone-polyimide fiber in accordance with claim 1.

* * * * *